United States Patent [19]

Pellegrino

[11] Patent Number: 5,413,451
[45] Date of Patent: May 9, 1995

[54] LOADING AND UNLOADING POWERED APPARATUS FOR TRUCKS AND THE LIKE

[75] Inventor: Luigi Pellegrino, Rivalba, Italy

[73] Assignee: Space S.r.l., San Mauro Torinese, Italy

[21] Appl. No.: 197,189

[22] Filed: Feb. 16, 1994

[30] Foreign Application Priority Data

Feb. 16, 1993 [IT] Italy .................. TO93A0096

[51] Int. Cl.⁶ .................................. B60P 1/36
[52] U.S. Cl. .................. 414/528; 414/523; 198/851
[58] Field of Search ............. 414/507, 523, 527–529, 414/532; 198/850–851

[56] References Cited

U.S. PATENT DOCUMENTS

| | | | |
|---|---|---|---|
| 2,679,941 | 6/1954 | Roesies | 414/527 |
| 2,710,105 | 6/1955 | Schwartz | 414/528 X |
| 3,478,905 | 11/1969 | Strid | 414/528 X |
| 3,819,072 | 6/1974 | Reed | 414/528 |
| 3,913,760 | 10/1975 | Koral | 414/528 |
| 4,068,769 | 1/1978 | Sweet et al. | 414/528 X |
| 4,505,634 | 3/1985 | Rezac | 414/528 |
| 4,553,663 | 11/1985 | Johnson | 198/850 X |

FOREIGN PATENT DOCUMENTS

| | | | |
|---|---|---|---|
| 2048853 | 7/1992 | Canada | 414/528 |
| 0242276 | 10/1987 | European Pat. Off. | |
| 0392993 | 10/1990 | European Pat. Off. | |
| 0508032 | 10/1992 | European Pat. Off. | |
| 2482531 | 11/1981 | France | 414/528 |
| 2483340 | 12/1981 | France | 414/528 |
| 2553045 | 4/1985 | France | 414/528 |
| 3828914 | 3/1990 | Germany | |
| 3832465 | 4/1990 | Germany | 414/528 |
| 0295740 | 12/1987 | Japan | 414/528 |
| 9204263 | 3/1992 | WIPO | |

Primary Examiner—Michael S. Huppert
Assistant Examiner—James W. Keenan
Attorney, Agent, or Firm—Sughrue, Mion, Zinn, Macpeak & Seas

[57] ABSTRACT

Loading and unloading powered apparatus for trucks and the like comprising a support frame and a plurality of side by side slat conveyors driven by a central electrical motor and each of which comprises a pair of endless chains with respective transverse pins protruding laterally and a plurality of adjacent slats formed on the respective sides thereof with pairs of tubular bosses within which the projecting transverse pins of the two chains are fitted.

10 Claims, 4 Drawing Sheets

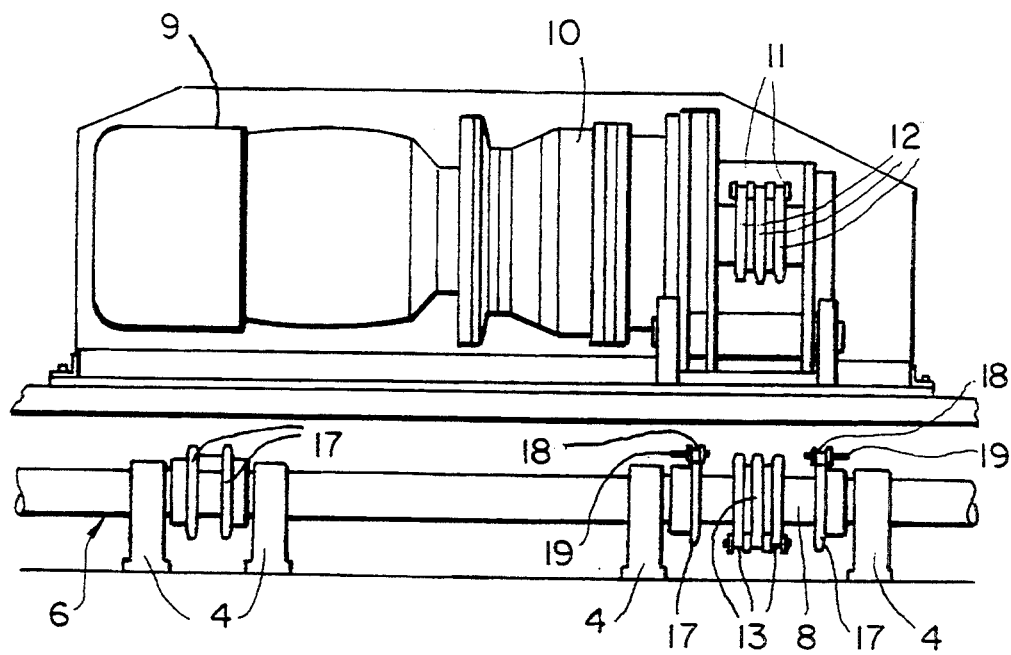
FIG.3
FIG.4
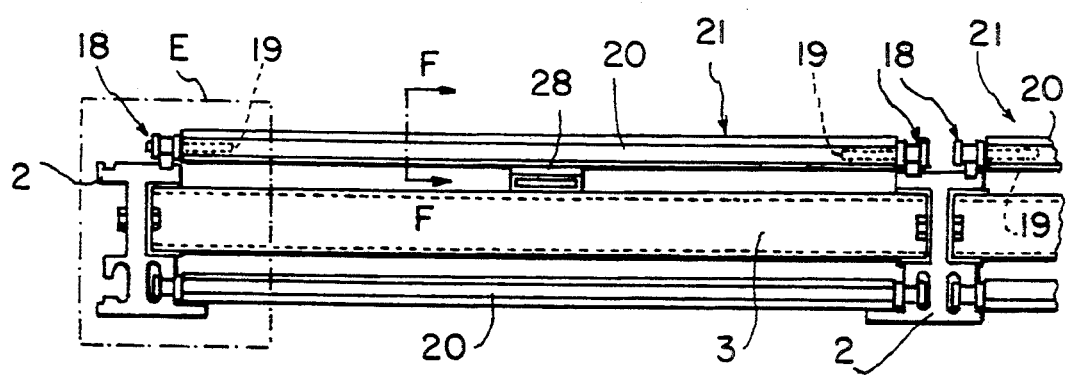

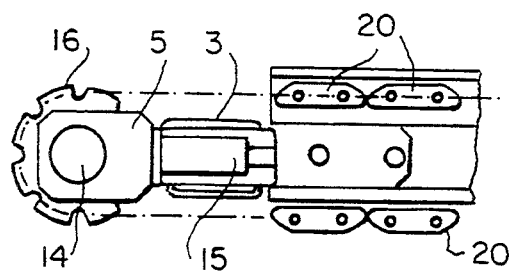
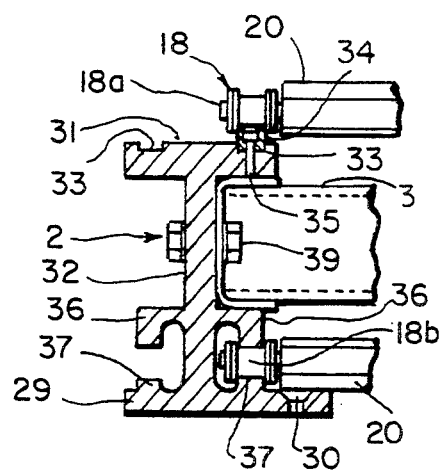
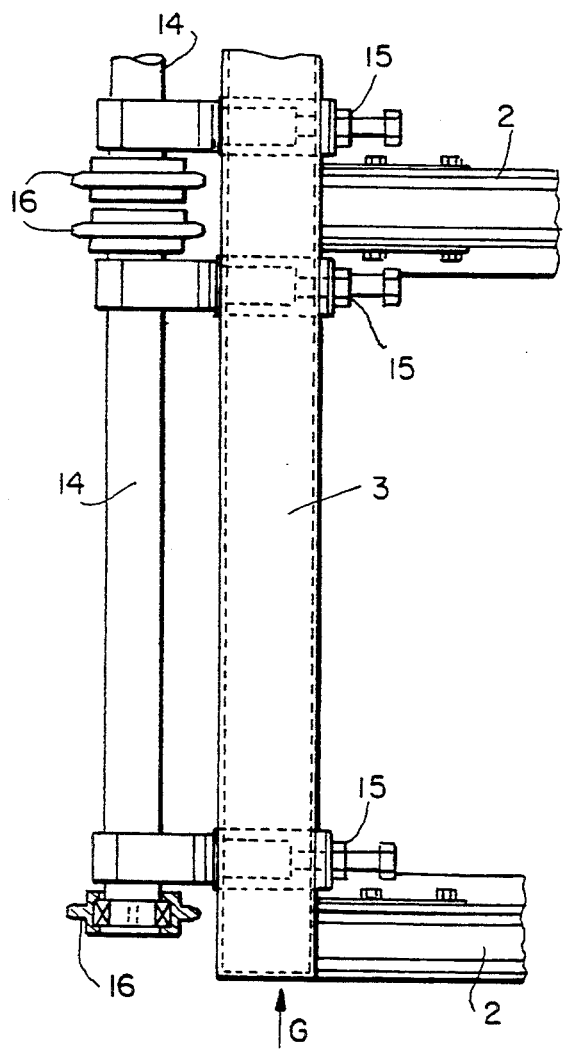
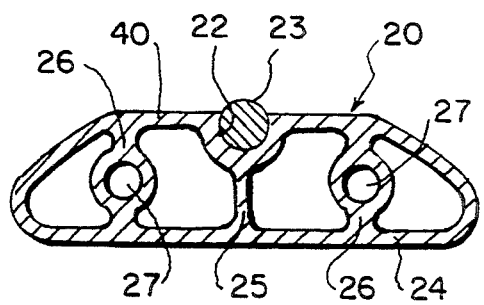

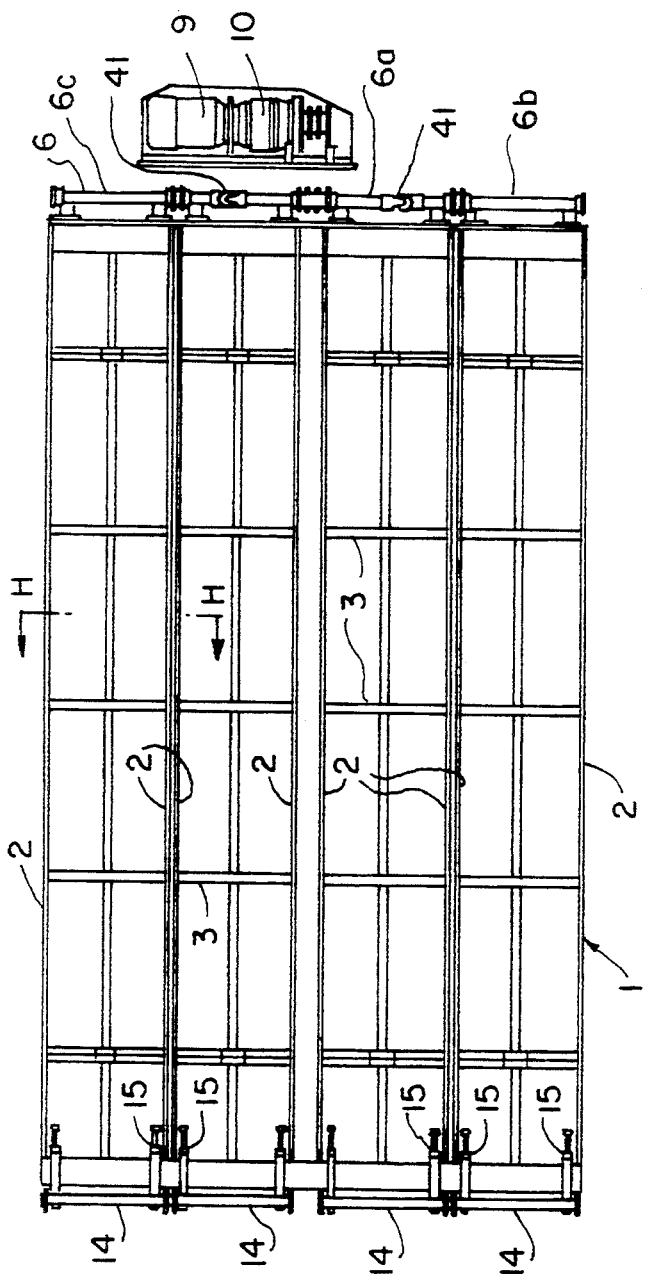

LOADING AND UNLOADING POWERED APPARATUS FOR TRUCKS AND THE LIKE

BACKGROUND OF THE INVENTION

The present invention is related to loading and unloading powered apparatus for trucks and the like.

Apparatus of this kind are known in the art, which are constituted by permanent installations on board the truck or the like, employing ropes or chains over which the loads to be transferred inside or outside the truck or the like are directly bearing, or making use of belt conveyors constituted by endless or mutually articulated elements.

These known apparatus are generally complicated and expensive to be manufactured and installed, are with difficulty adaptable to load surfaces having different width and length dimensions, and moreover involve problems (particularly in the case of vehicles provided with refrigerating equipment) related to periodic cleaning of the area comprised between the load platform of the truck or the like and the loading and unloading apparatus.

SUMMARY OF THE INVENTION

The object of the present invention is to overcome the above drawbacks, and to provide a loading and unloading powered apparatus adapted to be manufactured in a relatively simple and economical way, constituted by modular elements which can be easily adapted during assembling to different user sizes, and further designed so as to make comfortable and convenient, in use, periodical cleaning operations of the load platform of the truck or the like.

These objects are achieved by virtue of the fact that the loading and unloading-powered apparatus according to the invention is mainly characterised in that it comprises:

- a support frame intended to be fixed horizontally onto a load platform of a truck or the like and including a plurality of longitudinal members connected to each other by transverse members,
- a plurality of side by side slat conveyors each of which comprises a pair of endless chains which are engaged onto a first and a second transverse shaft rotatably supported at the ends of the support frame, said chains having respective upper and lower runs guided along said longitudinal members, and respective transverse pins projecting laterally thereof and a plurality of adjacent slats formed at the respective opposite sides thereof with pairs of tubular bosses within which said projecting transverse pins of the two chains are fitted, and
- a powered driving assembly of the said chains of the slat conveyor, including a motor located adjacent to the first transverse shaft and transmission means between said motor and a central portion of said first shaft.

Said slat conveyors are conveniently disposed so as to define a longitudinal separation zone aligned with said central portion of the first shaft.

The driving engine, which is conveniently electrical, can be installed inside or outside the loading area of the truck or the like. In the case of outside installation, the central arrangement of the motor enables application thereof even onto semitrailers, without any problem of interference with the connecting fifth wheel between the semitrailer and the tractor.

According to a preferred embodiment of the invention, the second transverse shaft is divided into two separate shaft portions, each of which has a width corresponding to that of a respective slat conveyor, and respective tensioning means for the chains of the respective slat conveyor are associated to each said shaft portions.

The invention further contemplates peculiar functional arrangements of the longitudinal members of the support frame as well as of the slats making up the slat conveyors, which enable a modular manufacturing of the apparatus and provision thereof by the manufacturer as a mounting kit for the user. Mounting can be performed simply and easily, without any need of weldings but solely by means of screw connections and fixings.

In the installed condition, the apparatus according to the invention allows to make total use of the loading surface of the truck or the like, both in the length direction and in the width direction, with an extremely reduced encumbrance in terms of thickness. Nevertheless the periodical cleaning operations of the load platform of the truck or the like can be carried out in a simple and convenient way.

BRIEF DESCRIPTION OF THE DRAWINGS

Further features and advantages of the invention will become apparent through the following detailed description, referring to the accompanying drawings purely provided by way of non-limiting example, in which:

FIG. 3 shows in an enlarged scale the detail indicated in section B of FIG. 2, FIG. 4 is a sectioned and enlarged view along line D—D of FIG. 2, FIG. 5 shows in an enlarged scale the detail indicated in section C of FIG. 2, FIG. 6 is a lateral elevational view according to arrow G of FIG. 5, FIG. 7 shows in an enlarged scale the detail depicted in section E of FIG. 4, FIG. 8 is a sectioned and enlarged view along line F—F of FIG. 4, FIG. 9 shows, in a simplified form, a variant of FIG. 2 and FIG. 10 is a sectioned and enlarged view along line H—H of FIG. 9.

DETAILED DESCRIPTION OF THE INVENTION

Figure 1:
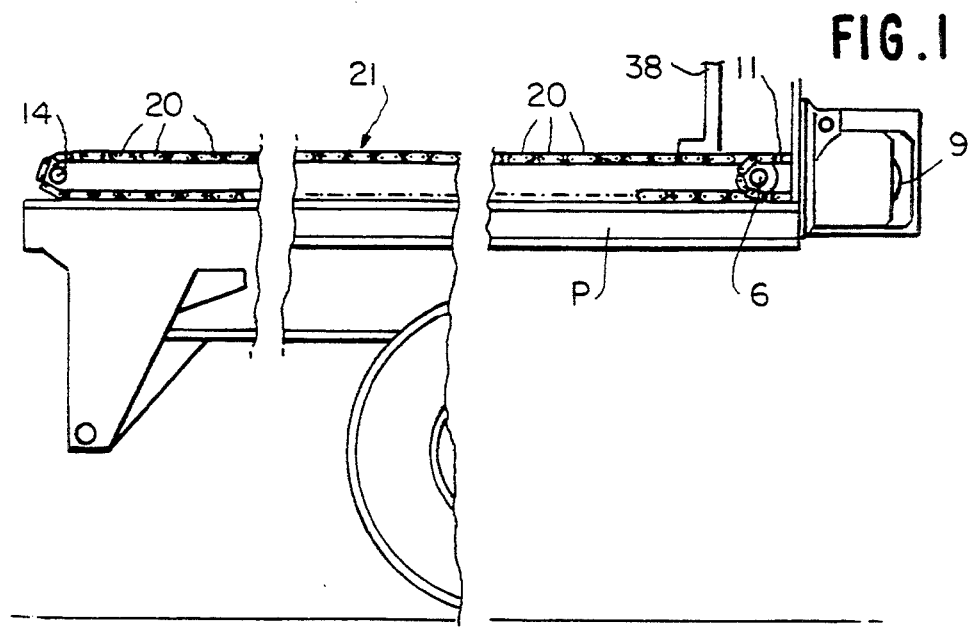
FIG. 1 is a partial and diagrammatic side elevational view of a load platform of a truck provided with a loading and unloading powered apparatus according to the invention.
Figure 2:
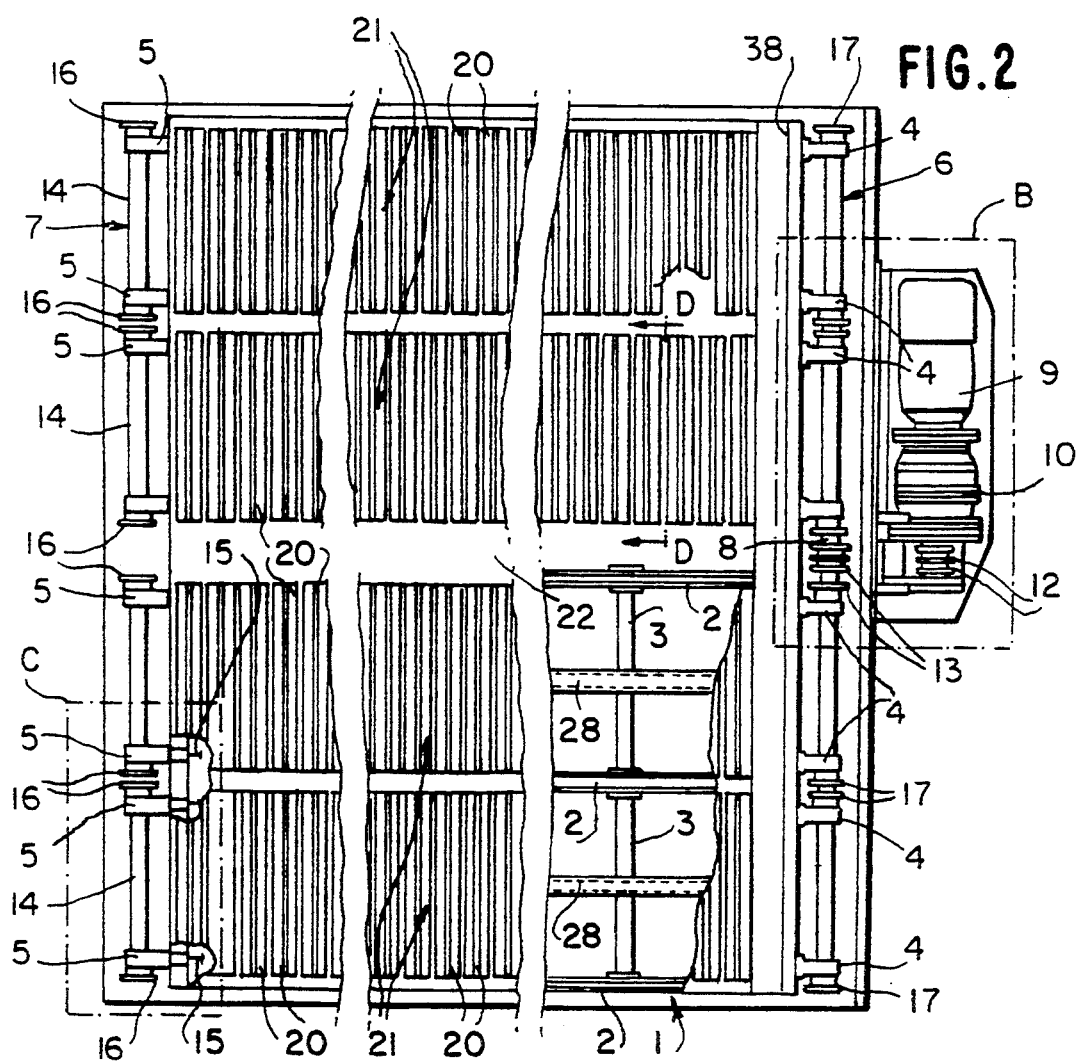
FIG. 2 is a top plan view of FIG. 1.

Referring initially to FIGS. 1 and 2, reference P generally designates the load platform of a truck or the like, over which a powered apparatus according to the invention is installed, for transferring from the outside onto the platform P and vice-versa a load assembly, for instance carried by pallets or containers.

The apparatus according to the invention comprises a support frame 1 constituted by a plurality of longitudinal members 2, rigidly fixed to the platform P in the way which will be explained herebelow, and rigidly connected to one another by transverse members 3.

The front and respectively, rear ends of the support frame 2 carry a series of hollow brackets 4, 5, respectively through which a first shaft or front shaft 6, and a second shaft indicated as a whole with 7, respectively are rotatably supported.

The front shaft 6 is formed by a single piece having a central portion 8 operatively connected with an electric motor 9 and associated gear reduction unit 10, which are supported by the truck structure inside or, more conveniently as in the case of the shown example, outside the loading area corresponding to the platform P.

The drive of the front shaft 6 by the motor 9 is performed through any suitable systems, for instance by means of an endless chain 11 transmission (which can be seen in better detail in FIG. 3), engaging driving and driven sprocket wheels 12 and 13, respectively, the second ones of which are fixed in rotation with the central portion 8 of the front shaft 6.

The second shaft or rear shaft 7 is preferably constituted by a series of separate elements 14 (four in the shown example), independently connected to the frame 1 by means of the respective brackets 5. Actually, these brackets 5 are connected to the rear transverse member 3 of the frame 1 so as to be horizontally adjustable relative to the frame 1, by means of respective screw and nut tensioning devices 15, shown in better detail in FIG. 5 and in FIG. 6 (wherein the screws have been omitted for simplicity of illustration).

Each shaft element 14 carries at the ends thereof a pair of sprocket wheels 16 which are aligned with corresponding pairs of sprocket wheels 17 carried by the front shaft 6.

Each pair of corresponding sprocket wheels 16, 17 is engaged by a respective endless chain 18 (shown in better detail in FIGS. 4 and 7) of the roller-pin and double pitch type, which are supported in a guided way, as it will be clarified herebelow, by the longitudinal members 2.

The pins of these chains 18, which are placed as usual transverse to the longitudinal direction thereof, have respective extensions 19 (FIGS. 3 and 4) for the connection to a plurality of adjacent slats 20, which define with the chains 18 a plurality of rolling slat conveyors 21. In the case of the shown example these slat conveyors 21 are in number of four and are placed so as to cover the entire surface of the platform P both longitudinally and transversally, but for a central area 22, aligned with the transmission between the motor 9 and the front shaft 6, to the aim of making easier the operations of periodical cleaning of the platform P.

The slats 20 of each slat conveyor 21 are deprived of mutual connections or articulations. As it is shown in better detail in FIG. 8, each such slat 20 is conveniently constituted by a profiled metallic hollow extruded element, for instance made of aluminium or alloys thereof, having in cross section a substantially isosceles trapezoid design with rounded corners and with a shorter base, indicated as 40, facing outwardly of the support frame 1. The shorter base 40 is formed with a median groove 22, having a substantially semi-circular shape, within which a resilient antislip member 23 is force-fitted, which is of elastomeric or plastic material and projects from the plane of the shorter base 40, so as to perform a gripping function for the load.

The shorter base 40 is connected to the longer base 24 of the trapezoid section through a longitudinal central web 25, situated beneath the groove 22, and through two longitudinal lateral ribs 26 formed centrally as tubular bosses 27. The tubular bosses 27 define the seats for engagement of the extensions 19 of the pins of the chains 18, for entrainment of the slats 20 by the latter.

As it can be seen in FIG. 4, further to be supported at their ends by the chains 18, the slats 20 centrally bear onto respective longitudinal sliding guides 28 fixed to the transverse members 3 between each pair of longitudinal members 2 of the support frame 1. The guides 28 are normally made by a self-lubricating high-resistance plastic material.

Turning now to FIG. 7, each longitudinal member 2 is constituted by a metallic extruded profiled element, also made by aluminium or alloys thereof, and formed interiorly with a horizontal base 29 provided with bores 30 for the fixing thereof to the platform P by means of screws, and with an upper horizontal wing 31 connected to the base 29 by means of a vertical rib 32.

The upper wing 31 is formed with a pair of longitudinal grooves 33 housing respective guides 34, normally made of steel, fixed by means of screw 35 and upon which the upper runs 18a of two respective chains 18 (or of a single chain 18 for the two longitudinal members 2 situated at the lateral edges of the frame 1) bear.

At a short distance from the base 29, the wing 32 is formed with a pair of substantially C-shaped lateral wings 36 facing towards a pair of corresponding longitudinal projections 37 of the base 29 and defining therewith respective guides for the sliding and retaining of the lower runs 18b of the two chains 18.

The ends of the transverse members 3 are fitted between the upper wing 31 and the lateral wings 36, and are fixed to the vertical rib 32 by means of through bolts 39.

In operation, the chains 18 of the slat conveyors 21 are driven simultaneously in one direction or in the opposite direction by the motor 9, through the front shaft 6, so as to drag from outside onto the platform P, and vice versa, loads bearing upon the slats 20 of the slat conveyors 21. Any elongation of the chains 18 can be compensated by acting on the tensioning devices 15.

To the aim of making the unloading operations easier, these slat conveyors 21 may be provided with vertical sideboards fixed to the respective initial slats 20.

FIGS. 9 and 10 show, in a simplified representation, an alternative embodiment of the support frame of the apparatus according to the invention: in these figures parts which are identical or similar to those previously described are indicated by the same reference numerals.

According to this embodiment the front shaft 6 is constituted by three sections, respectively a central section 6a and two lateral lateral sections 6b, 6c, of which the first one is driven by the electric motor 9 through the reduction unit 10, as in the previously disclosed embodiment, and drives the second ones through two universal joints 41.

Moreover, the longitudinal members 2 of the support frame 1 have a simplified design, and are in particular constituted by two C-profiled elements 42 (FIG. 10) whose upper and lower wings 42a, 42b carry respective guides 44 for the sliding of the upper runs 18a and of the lower runs 18b of the chains 18. These longitudinal members 42 are formed with respective apertures through which the transverse members 3, which in this case are constituted by continuous elements, are extending.

This arrangement provides, in comparison with the previously disclosed one, the advantage of making more convenient and easier, from the construction point of view, the predisposition of the apparatus as a mounting kit in the form of modular elements for assembling by the user.

Naturally the details of construction of the apparatus may be widely varied with respect to what has been disclosed and illustrated, without thereby departing from the scope of the present invention. Thus, for example, the number of the slat conveyors 21 might be different from that illustrated in the example, and these conveyors 21 might also be driven independently from one another, so as to perform differentiated loading and unloading functions along two or more longitudinal zones of the platform P. In this case the front shaft 6 might be constituted by two or more separate sections, driven by the motor 9 through respective couplings, or even driven by respective independent motors.

What is claimed is:

1. A loading and unloading powered apparatus for a truck having a horizontal load platform, said apparatus comprising:
   a support frame fixable horizontally onto said load platform of the truck and including a plurality of mutually connected longitudinal members and transverse members, said support frame having a front end and a rear end,
   a first and a second transverse shaft rotatably supported at said ends of the support frame, said first shaft having a central portion,
   a plurality of side by side slat conveyors each of which comprises a pair of endless chains having chain pins operatively engaged onto said first and second transverse shafts, said chains having respective upper and lower runs guided along said longitudinal members with said chain pins projecting laterally of said chains, and a plurality of adjacent slats having respective opposite ends formed with laterally extending tubular bosses within which said projecting chain pins of the two chains are engaged, and
   a powered driving assembly for driving said chains of the slat conveyors, including at least one motor located adjacent to the first transverse shaft and transmission means between said motor and said central portion of said first shaft.

2. Apparatus according to claim 1, wherein said slat conveyors are disposed so as to define a longitudinal separation zone aligned with said central portion of the first shaft.

3. Apparatus according to claim 1, wherein said second transverse shaft is divided into separate shaft portions each of which has a width corresponding to that of a respective slat conveyor, and further comprising respective tensioning means of the chains of the corresponding slat conveyor, associated to each of said second shaft portions.

4. Apparatus according to claim 3, wherein said tensioning means comprise movable supports of said second shaft portions onto said support frame, and associated screw and nut members for the positioning of said movable supports relative to said support frame.

5. Apparatus according to claim 1, wherein said longitudinal members are constituted by profiled elements having a horizontal base fixable to said platform of the truck, an upper horizontal wing formed with longitudinal grooves along which first guide means are fitted for the bearing of the upper runs of corresponding chains, a vertical rib connecting the base and the upper wing therebetween and to which said transverse members of the support frame are secured, and a pair of lateral wings projecting from opposite sides of the vertical rib above said base and defining therewith second guide means for the lower runs of corresponding chains.

6. Apparatus according to claim 5, wherein said support frame further comprises auxiliary longitudinal support means interposed between each pair of adjacent longitudinal members and upon which the slats of said slat conveyors are bearing in slidable contact.

7. Apparatus according to claim 1, wherein each said slat is constituted by a hollow element having in cross section a substantially isosceles trapezoid shape with rounded corners, and having a shorter base facing outwardly of said support frame, a longer base, and a pair of spaced-apart inner ribs, placed along the height of the trapezoid and formed with said tubular bosses, said inner ribs connecting said shorter base and said longer base therebetween.

8. Apparatus according to claim 7, wherein each slat is formed in correspondence of the shorter base thereof with a longitudinal substantially semi-circular median groove, and further comprising an antislip resilient element force-fitted within said median groove and projecting outwardly of said shorter base.

9. Apparatus according to claim 1, wherein said longitudinal members are constituted by C-shaped profiled elements having horizontal wings, said wings carrying respective guide means bearing the upper runs and the lower runs, respectively, of the corresponding chains.

10. Apparatus according to claim 1, wherein said motor is an electrical motor.

* * * * *